INVENTOR
R. L. CARBREY
BY George C. Ford
ATTORNEY

DECODER FOR PULSE CODE MODULATION

Filed Feb. 9, 1949 2 Sheets-Sheet 2

INVENTOR
R. L. CARBREY
BY George C. Lord
ATTORNEY

Patented Apr. 25, 1950

2,505,029

UNITED STATES PATENT OFFICE 2,505,029

DECODER FOR PULSE CODE MODULATION

Robert L. Carbrey, Summit, N. J., assignor to Bell Telephone Laboratories, Incorporated, New York, N. Y., a corporation of New York Application February 9, 1949, Serial No. 75,350

7 Claims. (Cl. 177—353)

This invention relates to receivers for pulse code modulation and more particularly to decoders for pulse code modulation systems employing pulses of three or more values or signaling conditions.

In communication systems utilizing what is known as pulse code modulation, a speech wave or other signal to be transmitted is sampled periodically to ascertain its instantaneous amplitude. The measured instantaneous amplitude represented by each sample is expressed by pulse codes analogous to telegraph codes involving permutations of a fixed number of code elements each of which may have any of several values or conditions. Because the total number of different amplitudes which may be represented by such a code of a fixed number of elements is limited, it is found desirable to divide the component range of amplitudes of which the transmitted signal is capable into a fixed number of constituent ranges which together encompass the total range. Each of these constituent ranges may then be treated as if it were a signal amplitude rather than a range and is represented by an individual one of the permutations of the code. In the use of this method of pulse code modulation, the instantaneous amplitude ascertained by a sampling operation is represented by the respective permutation indicative of the amplitude range most nearly approximating the amplitude of the measured sample.

One code which has advantageously been employed in pulse code modulation is the so-called binary code in which each of the fixed number of code elements may have either of two values. In this code each element is conveniently represented by either a pulse or the absence of a pulse, one pulse interval being required for the representation of each element. The total number of permutations and thus the total number of different amplitude ranges which may be expressed by such a code is equal to $2^n$.

When it is desired to employ a large number of amplitude ranges, it is, of course, necessary to transmit a large number of code element pulses. It will thus be seen that a point may be reached at which the number of code element pulses required per unit time is so great as to impose undue burdens upon the physical equipment required for the generation and transmission of the pulses. To overcome this difficulty pulse codes may be employed wherein each of the code elements may have more than the two values employed in the so-called binary code. Thus in a general sense, each of the code elements may have $m$ different values and the total number of permutations obtainable for a given number of code elements $n$ is $m^n$. In one advantageous code wherein each code element may have a plurality of values, $m$ has been taken as equal to 3 and a so-called ternary code constructed. In this code, each of the $n$ code elements may have any of three values, for example, 0, 1 or 2, which may be represented by code element pulses of corresponding amplitudes or by other convenient means. One system for producing code groups of pulses wherein each code element may have any of three or more different values is described in my copending application Serial No. 75,349, filed February 9, 1949.

It is the object of the present invention to provide a decoder for pulse code transmissions comprising code groups of $n$ code element pulses each of which may have any of $m$ different values.

In accordance with the invention, the decoder comprises a network of $n$ resistors connected in series between a source of potential and a sampling device, the values of the resistors being such that the total resistances between the source and the end of the successive resistors remote from this source are related as powers of $m$. Circuits responsive to the $m$ values of each code element pulse are arranged to selectively cause total currents of the $m$ respective amplitudes to flow from the source through the portions of the resistance network corresponding to the amplitude portions represented by each code element.

The above and other features of the invention will be described in detail in the following specification taken in connection with the drawings in which.

Although decoders according to the invention may be employed to decode pulse code transmission wherein $m$ and $n$ may have any desired values, it will be convenient for purposes of illustration to consider a decoder arranged for the receipt of code groups of pulses wherein $n$ the number of code elements is four and $m$ the number of different values assigned to each code element is three. For the purpose of the present description, it will be assumed that each of the code elements may have any of the values 0, 1 or 2 and that these values are distinguished in transmission on an amplitude basis. It will be recognized that the total number of amplitudes which may be represented by the code herein assumed is $3^4$ or 81. Following the convention which has heretofore been employed in the construction of binary codes, the first code group wherein each of the code elements is represented by the value 0 is employed to represent the smallest signal amplitude, this code group being written 0000. The next code group ordinarily representing a signal amplitude of 1 is then written 0001, those representing amplitudes of 2 and 3, 0002 and 0010, respectively, etc. It will be understood that each of the four code elements represents, depending upon its value, the presence in the sample amplitude of a definite portion of the total amplitude range expressed by the code. Thus the first code element beginning at the right by its values, 0, 1 and 2 represents amplitude components of 0, 1 and 2 units, respectively, the second code element by the values 0, 1 and 2 represents amplitude components of 0, 3 or 6, the third, amplitude components of 0, 9 or 18 and the fourth, amplitude components of 0, 27 and 54 units. If then a code group is received having the values 2112 where the code elements are numbered from the right, the corresponding amplitude is equal to 2+3+9+54 or 68.

Figure 1:
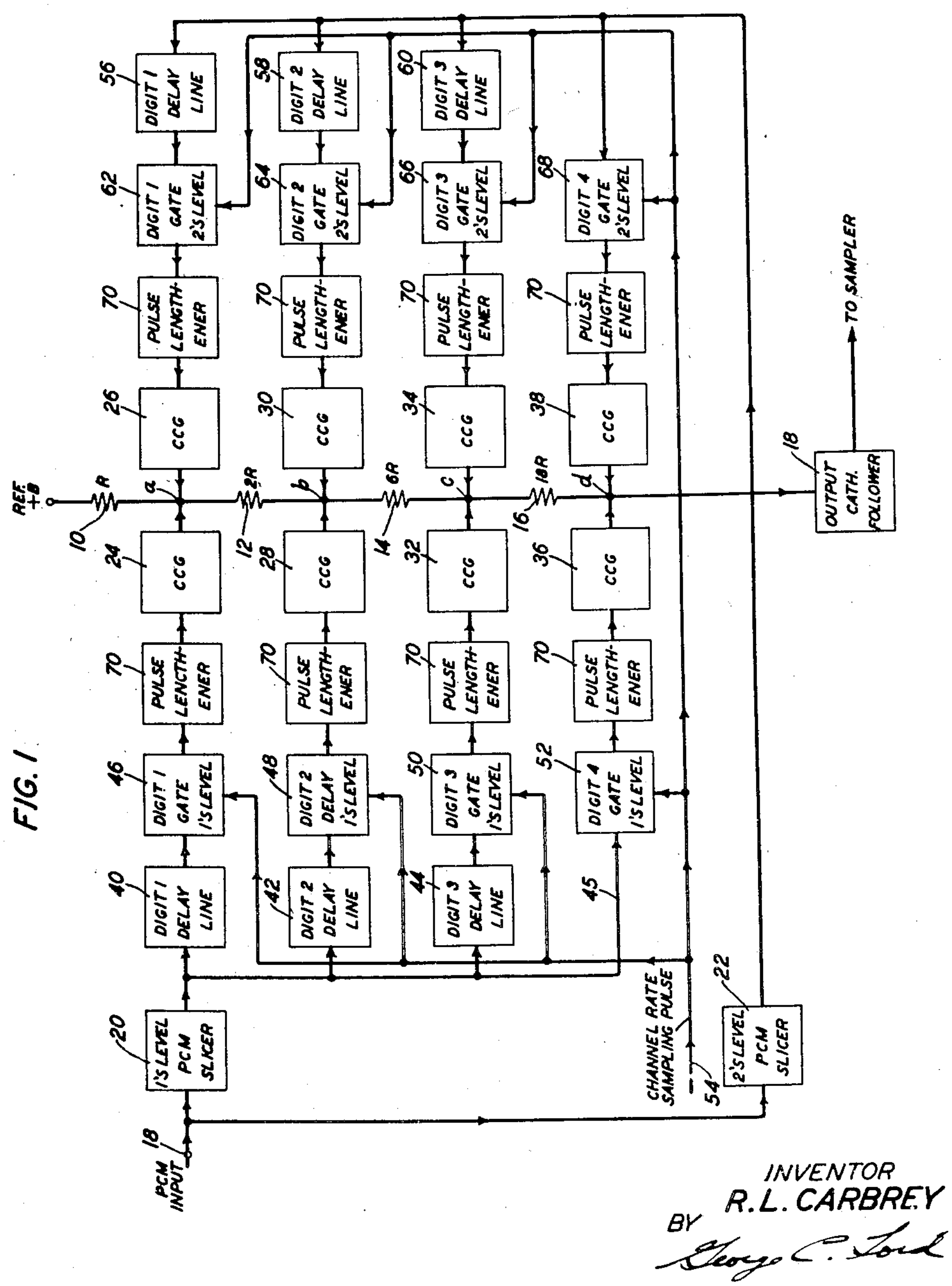
Fig. 1 is a block diagram of a decoding device in accordance with the invention.

A decoder for ternary pulse codes according to the invention is shown in block form in Fig. 1. In this decoder a series network comprising resistors 10, 12, 14 and 16 is connected between a source of potential indicated at B+ and an output circuit indicated in the drawing as comprising a cathode follower amplifier. The resistors 10 through 16 are proportioned to offer resistances equal respectively to R, 2R, 6R and 18R. If the points at the ends of the resistors most distant from the source of potential are identified as *a*, *b*, *c*, *d*, it will be recognized the total resistance between the source and point *a* is equal to R, that between the source and point *b* is equal to 3R, that between the source and point *c* is equal to 9R and that between the source and point *d* is equal to 27R. Thus the total resistances between the source and successive reference points are related as powers of three. The portions of the resistance network between the source of potential and the successive reference points correspond to the portions of the total signal amplitude represented by the four code element pulses.

In accordance with the invention means are provided at each of the reference points *a*, *b*, *c*, *d*, for drawing through the portion of the resistance network between the reference point and the source of potential currents which may selectively have any of the three values 0, 1 or 2 corresponding to the three values of the code element pulses received from the transmitter. Means for accomplishing this are shown in Fig. 1. Received code groups of pulses which may have any of the values 0, 1 or 2, are applied from input terminal 18 in parallel to two amplitude selector circuits 20 and 22, respectively. Amplitude selector 20 is arranged to produce an output pulse of arbitrary reference value in response to all input pulses having amplitudes equal to or greater than 1. Thus an output pulse is produced by this circuit in response to code element pulses having either of the values 1 or 2. Amplitude selector 22 on the other hand, is arranged to produce pulses of the same arbitrary reference value in response only to code element pulses having amplitudes of at least two. The outputs of the two amplitude selector circuits are employed to control respectively groups of constant current circuits connected to the reference points *a*, *b*, *c*, *d*. Two constant current circuits are provided for each code element one being controlled by the output of amplitude selector 20 and the other by the output of selector 22. These constant current circuits are shown in Fig. 1 at 24 and 26, respectively, connected to reference point *a*, 28 and 30 connected to reference point *b*, 32 and 34 connected to reference point *c* and 36 and 38 connected to reference point *d*.

Each of the constant current circuits is arranged normally to draw one unit of current from the source of potential at +B through the portion of the resistance network between the source of potential and the reference point to which it is connected. Thus under the conditions existing prior to the application of the received code group of pulses, constant current circuits 24 and 26 draw a total of two units of current through resistor 10 to produce a voltage drop equal to two units. Constant current circuits 28 and 30 draw a total of two units of current through the series combination of resistors 10 and 12 producing a voltage drop of 2×3 or six units. Constant current circuits 32 and 34 draw a total of two units of current through the series combination of resistors 10, 12 and 14 producing a drop of 2×9 or 18 units and constant current circuits 36 and 38 draw a total of two units of current through the series of combination of resistors 10, 12, 14 and 16 to produce a total drop of 2×27 or 54 units. It will be recognized that the sum of the drops so produced is equal to 2+6+18+54 or 80 units, this representing the maximum amplitude which may be expressed by the four element ternary code assuming that one code group (0000) is employed to represent an amplitude of 0.

If now the reference potential represented at +B is 80 units in amplitude, it will be seen that under normal conditions when all of the constant current circuits are drawing current through the respective portions of the resistance network the output applied to cathode follower amplifier 18 is equal to 0. The pulses of received code groups, other than the group 0000 corresponding to a signal amplitude of 0, are employed to turn off appropriate constant current circuits causing the total voltage drop to equal the difference between the maximum signal amplitude and the signal amplitude represented by the particular received code group. The control means for accomplishing these operations will now be considered with reference to the block diagram of Fig. 1.

Since the code element pulses are ordinarily transmitted serially over a single transmission circuit and it is desired simultaneously to adjust the currents flowing in the resistance network of the decoder it is convenient to transform the serially received code element pulses into groups of pulses occurring simultaneously in separate circuits. This operation is performed by two separate distributors shown herein as comprising groups of delay lines of different electrical lengths.. As a matter of convenience a separate distributor is provided for the output from each of amplitude selectors 20 and 22. Thus pulses from selector 20 corresponding to code element pulses of amplitudes 1 or 2 are applied during the code element intervals in which they occur to the paralleled inputs of three delay lines 40, 42 and 44. These delay lines introduce delays equal respectively to three, two and one code element intervals. The outputs of the three delay lines 40, 42 and 44 are applied respectively to separate gated amplifiers 46, 48 and 50 and the output of selector 20 is also applied to an additional gated amplifier 52.

Assuming for the moment that the received code group is such that each code element is represented by an output pulse from amplitude selector 20, it will be recognized that these pulses occur serially in the four code element intervals. These pulses are applied to gated amplifier 46 with a delay equal to three code element intervals, to gated amplifier 48 with a delay equal to two code element intervals to gated amplifier 50 with a delay equal to one code element interval and to gated amplifier 52 without delay. Thus at the time of the pulse for the fourth code element, pulses occur simultaneously at the inputs of the four gated amplifiers. At this time the first pulse of the group is present at the input of amplifier 46, the second at the input of amplifier 48 and the third and fourth pulses respectively at the inputs of amplifiers 50 and 52. These amplifiers are enabled simultaneously by a gating pulse applied over lead 54 and timed to occur at the completion of each code group of pulses.

The output pulses from amplitude selector 22 corresponding to code elements of amplitude 2 are applied through an identical distributor comprising delay lines 56, 58 and 60 respectively, to the inputs of gated amplifiers 62, 64 and 66 and are also applied to the input of gated amplifier 68 and these amplifiers are enabled simultaneously with amplifiers 46 through 52 at the conclusion of each code group period. Through the use of the circuits thus far described serial groups of code element pulses of values 0, 1 and 2 have been converted into simultaneously occurring pulses such that all pulses of amplitudes 1 or 2 are represented in separate circuits on the left-hand side of the resistance network in Fig. 1 while all pulses of amplitude 2 are represented in separate circuits on the right-hand side of this resistance network. Pulses occurring in the outputs of the eight gated amplifiers 46 through 52 and 62 through 68 are applied to pulse lengthening circuits 70, one of which is provided for the output of each gated amplifier, and the lengthened pulses are employed directly to control the operation of the corresponding constant current circuits.

It will be understood that if the code groups are transmitted on a frequency rather than a time division basis wherein each code element is transmitted separately over an individual communication channel such distributors will not be required. However separate amplitude selective circuits will be required for each signal output.

Figures 2, 3, 4:
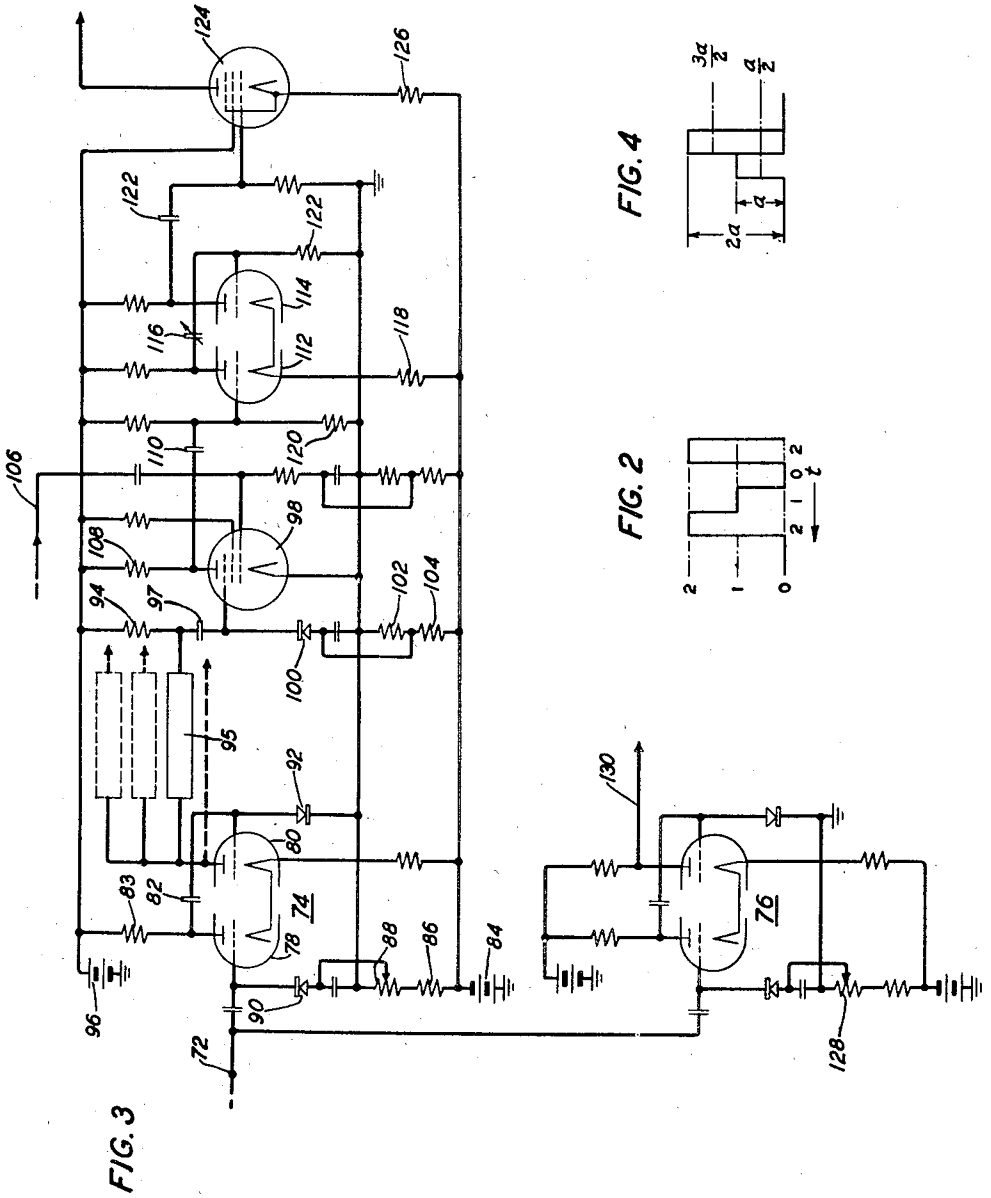
Fig. 2 is a representation of a typical code group of pulses of the type to be decoded by the circuit of Fig. 1.
Fig. 3 is a partial circuit schematic diagram illustrating details of certain of the component circuits of the decoder of Fig. 1.
Fig. 4 is a diagram illustrating the operation of portions of the circuit of Fig. 3.

For the purpose of explaining the operation of the decoder of Fig. 1, it will be assumed that a code group of four pulses as shown in Fig. 2 is applied to input terminal 18. This code group may be expressed numerically as 2102 and if the pulses are weighted starting at the right, the corresponding decimal number is $2+0+9+54=65$.

When this code group of pulses is applied at terminal 18, the first pulse, being of amplitude 2, is transmitted through both of the amplitude selectors 20 and 22 to the respective inputs of the two distributors. Thus pulses are simultaneously applied to the inputs of delay lines 40 and 56, which are arranged to introduced delays equal to three times the code element interval. (Of course, pulses are also applied to the inputs of the remaining delay lines, but, these particular pulses will make no contribution to the ultimate decoded output as they will be dissipated prior to the enabling of the gates.) In the second code element interval no pulse is applied to the decoding circuits but in the third interval a pulse of amplitude 1 appears at input terminal 18. This pulse is transmitted only through amplitude selector 20 to the input of the delay line distributor on the left-hand side of the decoding network. The pulse is delayed by one code element length in delay line 44 and therefore appears at the output of the delay line 44 simultaneously with the appearance at the outputs of delay lines 40 and 56 of the pulses corresponding to the first code element pulse. A pulse amplitude 2 appears in the final interval. This pulse is of sufficient amplitude to cause transmission of pulses through each of amplitude selectors 20 and 22 to the corresponding delay line distributors. These two pulses appear without delay simultaneously with the pulses appearing at the outputs of delay lines 40, 44 and 56. Thus, at the conclusion of the code group shown in Fig. 2 pulses are present at the inputs of gated amplifiers 46, 50, 62, 62 and 68. No pulses appear at the inputs of any of the other gate circuits at this particular time. All of the gate circuits are enabled simultaneously by a sampling pulse applied over lead 54 with the result that pulses are applied through pulse lengtheners 70 to constant current circuits 24, 32, 36, 26 and 38, respectively.

It will be recalled that initially each of the constant current circuits was turned on to draw current from the source of potential through the appropriate portions of the resistance network to produce a total drop between the source and point *d* equal to the total possible amplitude of the message signal to be transmitted. The effect of the code group shown in Fig. 2 may now be considered. Control pulses are applied to each of constant current circuits 24, 26, 32, 36 and 38 and interrupt the flow of current in these circuits. Only constant current circuits 28, 30, and 34 continue to draw current. Accordingly two units of current are drawn through the series combination of resistors 10 and 12, and one unit of current is drawn through the series combination of resistors 10, 12 and 14. The drop produced by the constant current circuits remaining in operation is thus equal to $2\times3+1\times9=15$ units and the output of the decoding network applied to cathode follower 18 is equal to the reference potential of 80 units less the unit drop or 65 units. This corresponds to the amplitude represented by the code group of Fig. 2 as stated above.

Circuit details of certain portions of the decoder of Fig. 1 are shown in Fig. 3. Thus terminal 72 represents the input to the decoder and pulses applied thereto travel through parallel circuits to the inputs of amplitude selectors 74 and 76 corresponding respectively to amplitude selectors 20 and 22 of Fig. 1. Each of these amplitude selectors comprises a single-trip multivibrator operated as a so-called slicing circuit, the slicing or selecting levels of the two single-trip multivibrators being adjusted to permit operation by pulses of amplitudes 1 and 2, respectively. Since these two amplitude selectors are identical with the single exception of the setting of a bias voltage level, only selector 74 will be considered in detail.

Selector 74 comprises two triode type tubes 78 and 80 shown in Fig. 3 as comprising the two sections of a dual triode tube connected in a single-trip multivibrator circuit. The cathodes of the two tubes are connected together to form the direct current intertube connection while the anode of tube 78 is connected through a coupling capacitor 82 to the control grid of tube 80 to provide the alternating current interconnection. A negative bias voltage from battery 84 is applied through resistor 86, variable resistor 88 and crystal rectifier 90 to the control grid of vacuum tube 78 and normally prevents the flow of current in this tube. Thus, because of the intertube connections, current normally flows through vacuum tube 80. Variable resistor 88 is so adjusted that a pulse of amplitude at least equal to one-half the amplitude taken to represent the pulse value one must be applied to the control grid thereof to initiate conduction through this tube. Referring to Fig. 4 the amplitudes of the two types of pulses transmitted in the code groups are shown as "a" and "2a." The tripping level of selector 74 is indicated by the dot-dash line labeled $$\frac{a}{2}$$

When any pulse of amplitude greater than $$\frac{a}{2}$$

appears at input terminal 72, the bias provided by battery 84 is overcome and vacuum tube 78 begins to conduct. This causes the anode potential of this tube to drop and this drop is applied through coupling capacitor 82 to the grid of normally conducting tube 80, thereby to cut off current flows in that tube, this effect being that which normally occurs in the well-known single-trip multivibrator circuit. The current which flows through triode 78 and anode load resistor 83 is just sufficient to develop the voltage required to maintain cut off of tube 80. Therefore, whenever the amplitude of the input pulse drops below the tripping level a reverse action takes place. Tube 80 again starts to conduct thereby reducing the current in tube 78. The resulting rise in potential at the anode of tube 78 is applied through coupling capacitor 82 to the grid of tube 80 to return it to its normally conducting condition, and the cathode follower action of tube 80 raises the cathode potential of tube 78 sufficiently to cut off that tube. As a result of these two actions a positive pulse will be produced at the anode of tube 80 the duration of which will be equal to the time the input pulse amplitude exceeded the tripping level $$\frac{a}{2}$$

Coupling capacitor 82 and the resistance of crystal rectifier 92 in the high impedance direction must be sufficiently large to prevent tube 80 from returning to its normally conducting condition due to the discharge of capacitor 82 for all normal sequences of code group pulses. Crystal rectifiers 90 and 92 serve to restore the direct current components of the input pulse train so that the base reference potential at the grids of tubes 78 and 80 will remain the same for all normal pulse sequences.

When vacuum tube 80 is cut off in response to an input pulse, the flow of current in its anode circuit ceases and the anode potential rises. A plurality of delay lines corresponding to lines 40, 42 and 44 of Fig. 1 are connected in parallel to the anode of tube 80 and an additional connection is made corresponding to lead 45 of Fig. 1. The circuits associated with this connection and those associated with each delay line are identical and only the circuit connected to the output of delay line 95, Fig. 3 will be considered in detail.

The output of delay line 95 is connected through a resistor 94 to a source of positive potential such as battery 96. Positive pulses thus appear at the output of the delay line at a time determined by the electrical length of the line. These positive pulses are applied through a coupling capacitor 97 to the suppressor grid of a pentode type tube 98 which is operated as a gated amplifier. A suitable negative bias is applied to the suppressor grid through the rectifier 100, the bias voltage being obtained from the junction of voltage divider resistors 102 and 104 connected in series between bias battery 84 and ground. Rectifier 100 serves as a so-called direct current restorer to maintain the base reference level for pulses applied to the circuit. A positive gating pulse is applied to the control grid of gated amplifier 98 over lead 106, and, if a positive pulse is simultaneously present on the suppressor grid of the tube, current will flow through the tube with a resultant drop across anode resistor 108.

The negative pulses produced by the gated amplifier are applied through a coupling capacitor 110 to the control grid of triode tube 112 which is connected with a second triode tube 114 in a single-trip multivibrator circuit. In this circuit the anode of triode 112 is connected to the control grid of triode 114 through a coupling capacitor 116 and the cathodes in the two tubes are connected together and through a common cathode resistor 118 to a source of negative potential such as battery 84. The control grids of the two tubes are connected through resistors 120 and 122, respectively, to ground, the relative values of these two resistors being so adjusted that current normally flows in vacuum tube 112 and vacuum tube 114 is normally cut off. Accordingly, the anode potential of vacuum tube 114 is normally equal to the potential of anode supply battery 96. Upon receipt of a negative pulse through coupling capacitor 110, the flow of current through triode 112 is cut off and, because of the intratube coupling circuits, current flow is initiated through tube 114 as in the conventional single-trip multivibrator. The anode potential of tube 114 therefore drops and current through tube 114 continues for an interval determined by the time constant of the circuit comprising capacitor 116 and resistor 122. At the conclusion of this interval, the voltage at the control grid of tube 14 drops sufficiently to cause cessation of the flow of current in that tube and the reestablishment of current flow in tube 112. The relatively short negative pulse during the output of the gated amplifier is thus converted into a negative pulse of considerably greater duration which appears at the anode of tube 114.

The negative pulse output of the pulse lengthening circuit is applied through capacitor 122 to control the flow of current through a constant current circuit shown herein as a pentode type tube 124, the cathode resistor of which 126 is un-bypassed. In this circuit the cathode of tube 124 is connected through resistor 126 to a source of negative potential such as bias battery 84 sufficient to permit the flow of current through the tube. The negative pulse from the pulse lengthener circuit cuts off the flow of current to per-form the required decoding operation as described in connection with the block diagram of Fig. 1.

Amplitude selector 76 is identical to amplitude selector 74 described above with the exception that adjustable resistor 128 is set to provide tripping of the circuit in response to pulses of amplitudes greater than that shown by the dot-dash line at $$\frac{3a}{2}$$

of Fig. 4. Thus, it will be understood that only those code element pulses of amplitude 2 will be effective to cause operation of single-trip multivibrator 76. The output of single-trip multivibrator 76 appearing on lead 130 is applied to circuits identical to those connected to the output of single-trip multivibrator 74.

What is claimed is:

1. A decoder for code groups of pulses, each group representing a signal amplitude and comprising $n$ code element pulses which may have any of a number of values $m$ which is greater than 2, each of said pulses representing different components of the total possible amplitude of a transmitted signal comprising a network of $n$ resistors connected in series, a source of potential connected to one end of said network, the magnitudes of said resistors being such that the total resistances between said source and the ends of successive resistors remote from said source are related as powers of $m$ and means responsive to the $m$ values of each code element pulse to cause total currents of the $m$ respective values to flow from said source through portions of the resistance network corresponding to the amplitude components represented by each code element pulse.

2. A decoder for code groups of pulses, each group representing a signal amplitude and comprising $n$ code element pulses which may have any of a number of amplitudes $m$ which is greater than 2, each of said pulses representing different components of the total possible amplitude of a transmitted signal comprising a network of $n$ resistors connected in series, a source of potential connected to one end of said network, the values of said resistors being such that the total resistances between said source and the ends of successive resistors remote from said source are related as powers of $m$, means respectively responsive to code element pulses of all $m$ amplitudes to cause equal currents to flow from said source through portions of said resistance network corresponding to the amplitude components represented by each code element pulse and means respectively responsive to code element pulses of all $m$ amplitudes other than the greatest to cause currents equal to those controlled by said last-mentioned means to flow from said source through portions of said resistance network corresponding to the amplitude componets represented by each code element pulse.

3. A decoder for code groups of pulses, each group representing a signal amplitude and comprising $n$ code element pulses which may have any of a number of values $m$ which is greater than 2, each pulse representing different components of the total possible amplitude of a transmitted signal comprising a network of $n$ resistors connected in series, a source of potential connected to one end of said network, the magnitudes of said resistors being such that the total resistances between said source and the ends of successive resistors remote from said source are related as powers of $m$, means connected to the end of each resistor remote from said source and respectively responsive to code element pulses of all $m$ values to cause equal currents to flow from said source through portions of said resistance network corresponding to the amplitude portions represented by each code element pulse and means also connected to the end of each resistor remote from said source and respectively responsive to code element pulses of all $m$ values other than the greatest to cause currents equal to those produced by said last-mentioned means to flow from said source through portions of said resistance network corresponding to the amplitude components represented by each code element pulse.

4. A decoder for code groups of pulses, each group representing a signal amplitude and comprising $n$ code element pulses which may have any of a number of amplitudes $m$ which is greater than 2, each pulse representing different components of the total possible amplitude of a transmitted signal comprising a network of $n$ resistors connected in series, a source of potential connected to one end of said network, the values of said resistors being such that the total resistances between said source and the ends of successive resistors remote from said source are related as powers of $m$, means connected to the end of each resistor remote from said source and respectively responsive to the $m$ amplitudes of each code element selectively to cause currents of the respective $m$ amplitudes to flow from said source through the portions of the resistance network corresponding to amplitude components represented by each code element pulse.

5. A decoder for code groups of pulses, each group representing a signal amplitude and comprising $n$ code element pulses, each of which may have any of a number of amplitudes $m$ which is greater than 2, a network of $n$ resistors connected in series, a source of potential connected to one end of said network, the values of said resistors being such that the total resistances between said source and the ends of successive resistors remote from said source are related as powers of $m$, a first constant current circuit connected to the end of each resistor remote from said source and responsive to pulses of all $m$ amplitudes other than zero to cause current to flow from said source through the corresponding resistors, each of said first constant current generators being responsive only to pulses of a respective one of the code elements of any code group and a second constant current circuit connected in parallel with each of said first constant circuits and being responsive only to pulses of the $m$ amplitudes less than the greatest amplitude and greater than zero to cause currents equal to those drawn by said first constant current circuits to flow from said source through the corresponding resistors, each of said second constant current circuits being responsive only to the pulses of a respective one of the code elements of any code group.

6. A decoder for code groups of pulses, each group representing a signal amplitude and comprising $n$ serially occurring code element pulses which may have any of a number of amplitudes $m$ which is greater than 2, each pulse representing different components of the total possible amplitude of a transmitted signal comprising a network of $n$ resistors connected in series, a source of potential connected to one end of said network, the values of said resistors being such that the total resistances between said source and the ends of successive resistors remote from said source are related as powers of $m$, and means connected to the end of each resistor remote from said source responsive to the $m$ amplitudes of each code element to cause currents of the $m$ respective amplitudes to flow from said source through the portions of the resistance network corresponding to amplitude components represented by each code element pulse, means for distributing the serially occurring pulses of a code group to occur simultaneously in separate lines and connections from said separate lines to each of said current controlling means.

7. A decoder for code groups of pulses, each group representing a signal amplitude and comprising $n$ code element pulses which may have any of a number of amplitudes $m$ which is greater than 2, each pulse representing different components of the total possible amplitude of a transmitted signal comprising a network of $n$ resistors connected in series, a source of potential connected to one end of said network, the values of said resistors being such that the total resistances between said source and the ends of successive resistors remote from said source are related as powers of $m$, separate means for each of said $m$ amplitudes other than zero for drawing equal currents through portions of said resistance network corresponding to the amplitude portions represented by each code element pulse, amplitude discriminatory means for separating the pulses of the $m$ amplitudes and applying only pulses at least equal to the respective $m$ amplitudes to the corresponding ones of said $m$ current drawing means.

ROBERT L. CARBREY.

REFERENCES CITED

The following references are of record in the file of this patent:

UNITED STATES PATENTS

| Number | Name | Date |
|---|---|---|
| 1,587,122 | Harlow | June 1, 1926 |